United States Patent [19]

Murphy

[11] 4,127,356
[45] Nov. 28, 1978

[54] WIND MOTOR MACHINE

[75] Inventor: Richard D. Murphy, Plainview, Tex.

[73] Assignee: Thomas R. Tipps, Amarillo, Tex. ; a part interest

[21] Appl. No.: 804,990

[22] Filed: Jun. 9, 1977

[51] Int. Cl.² ............................................. F03D 7/00
[52] U.S. Cl. ...................................... 415/2; 415/28; 415/145; 290/55
[58] Field of Search ................................... 415/2–4, 415/18, 26, 28, 145–149, 203; 417/334; 290/54, 55

[56] References Cited

U.S. PATENT DOCUMENTS

| 147,282 | 2/1874 | Pratt | 415/4 |
|---|---|---|---|
| 744,065 | 11/1903 | Gran | 415/18 |
| 757,800 | 4/1904 | Williams | 415/3 |
| 969,587 | 9/1910 | Williams | 415/3 |
| 1,025,428 | 5/1912 | Stanschus | 415/3 |
| 1,312,021 | 8/1919 | Dickinson et al. | 290/55 |
| 1,345,022 | 6/1920 | Oliver | 415/3 |
| 1,646,723 | 10/1927 | Bonetto | 290/55 |
| 1,935,097 | 11/1933 | Nelson | 415/3 |

FOREIGN PATENT DOCUMENTS 1,011,132  6/1952  France ........................................ 415/4

*Primary Examiner*—C. J. Husar
*Attorney, Agent, or Firm*—Wendell Coffee

[57] ABSTRACT

An impeller having an axle with radial vanes is mounted within a housing. The housing includes a funnel to direct a large amount of wind into the impeller. Air fins on top of the housing maintain the funnel pointed into the wind. A flap upon the top of the housing will fold downward as the wind increases and this will raise a throttle valve at the throat of the funnel. In addition, the flap will close exhaust openings from the housing, also reducing the wind on the vanes. Two additional flaps act as pressure relief valves in the funnel which open to dump wind at excessive velocity. Furthermore, a leeward flap on the side of the funnel is blown out to an extended position at high winds which causes the housing to rotate upon its circular tracks to bring the funnel opening away from the wind. The air fins on top of the housing are blown down from the vertical position as the wind strikes the housing sideways.

The housing is mounted upon a frame which extends horizontally outward from the housing. The frame is mounted by wheels upon concentric rails. Therefore, the housing can be maintained directly into moderate winds by rotating around upon the rails or high winds will cause the housing to rotate away from the wind. The large frame prevents the unit from blowing over.

15 Claims, 5 Drawing Figures

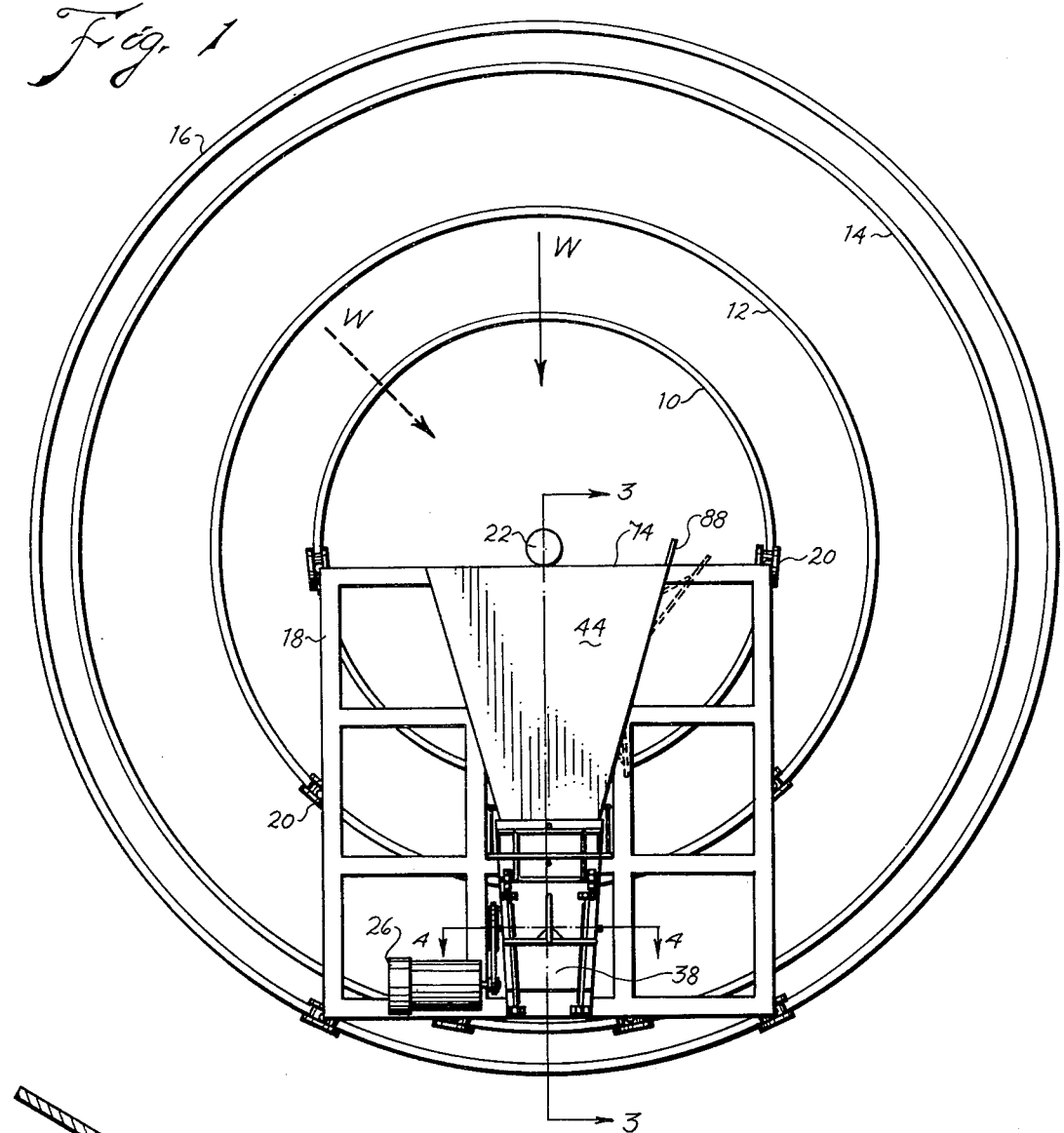

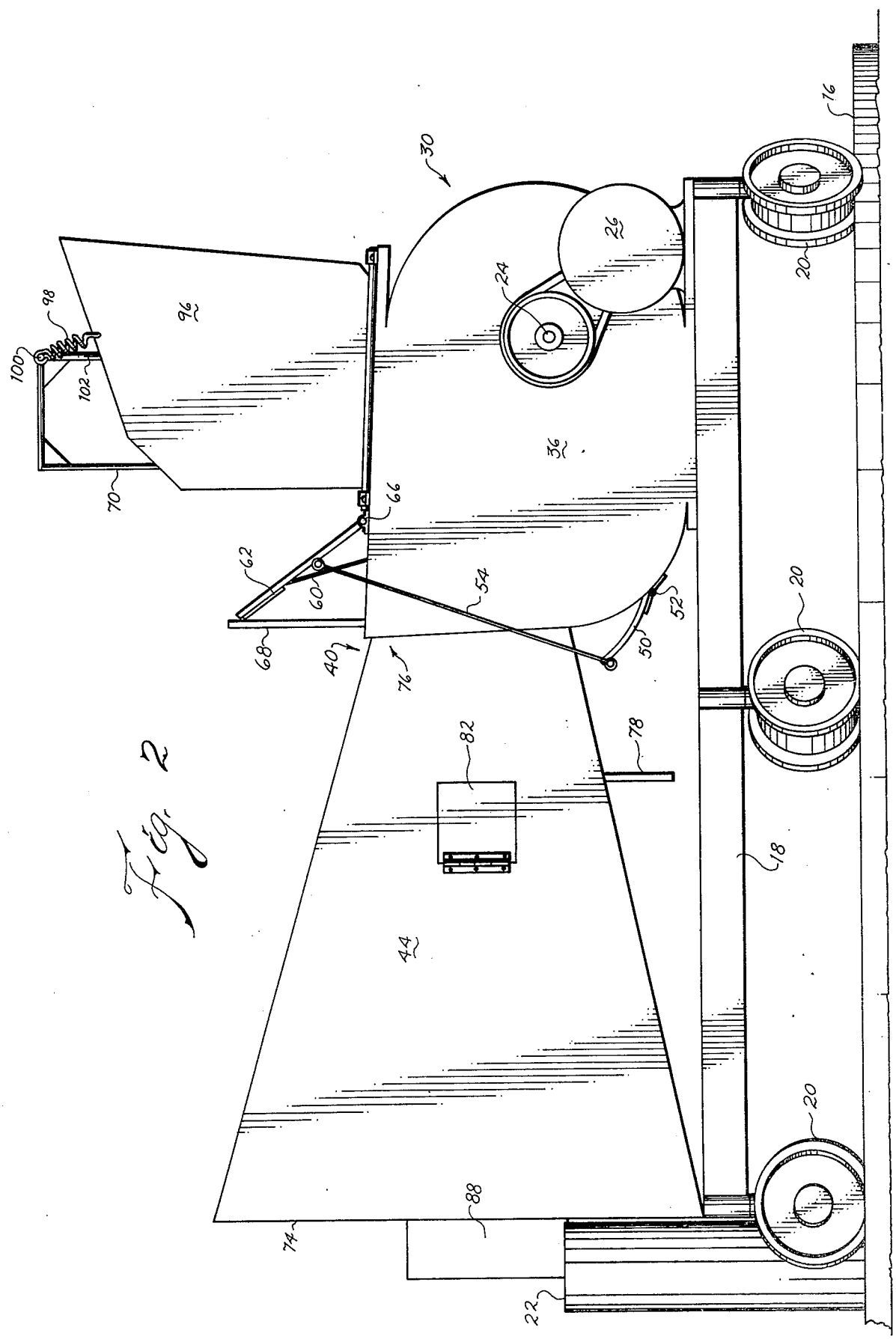

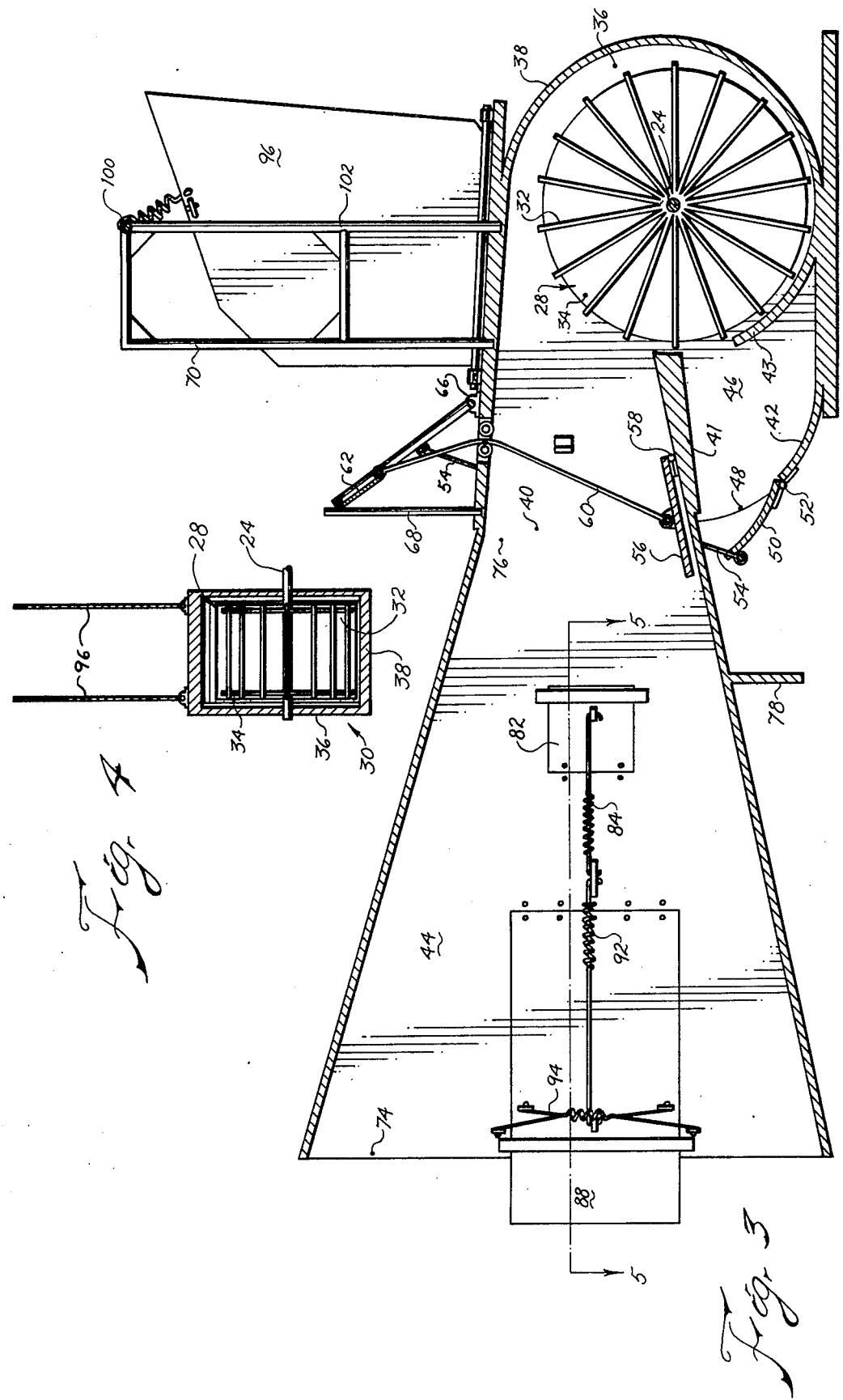

WIND MOTOR MACHINE

BACKGROUND OF THE INVENTION (1) Field of the Invention

This invention relates to wind motor machines to convert wind energy into other energy forms and more particularly to machines wherein the impeller is housed and the housing is mounted on a circular track for orientation to the wind.

(2) Description of the Prior Art

Certain workers in the prior art had funnels to direct the air into a housing against impellers. E.g., CLARK U.S. Pat. No. 1,315,595. Also seen UZZELL U.S. Pat. Nos. 3,883,750 and RUDISILL 2,517,135.

In addition to having funnels, others also had elaborate systems to point the funnel into the wind. E.g., WILLIAMS U.S. Pat. No. 757,800. Applicant was also aware of the patent to GEFFCKEN U.S. Pat. No. 2,144,719 at the time this application was prepared.

SUMMARY OF THE INVENTION

New and Different Function

I have invented a wind motor machine to extract energy from the wind which uses an impeller having radial blades on which the wind impacts. The blades extend from the axis radially outward in a plane containing the axis.

The housing in which they are mounted includes a funnel to direct the wind to the impellers and increase the wind at the impellers. To prevent excessive speed of the motor, I provide a choke flap projecting upward from the housing. Excessive wind will blow the flap down. Cables from the flap will close a throttle valve near the throat of the funnel to reduce its cross sectional area and thereby reduce the wind on the impeller. Also, cables connected to the choke flap will close the exhaust openings. In addition to this, valves similar to pressure relief valve are provided on the side of the funnel to dump air from the funnel at excessive wind speeds.

Finally, a levered flap on the side of the funnel will blow out and extend outward to catch the wind and rotate the entire housing on the circular tracks away from the wind. At this time, fins on top of the housing fold downward due to the wind upon the side of them so they no longer tend to hold the housing into the wind.

It may be seen that the function of the entire machine is far greater than the sum of the individual functions of flaps, funnels, cables, etc.

Objects of this Invention

An object of this invention is to extract usable energy from the wind.

Further objects are to achieve the above with a device that is sturdy, compact, durable, lightweight, simple, safe, efficient, versatile, ecologically compatible, and reliable, yet inexpensive and easy to manufacture, install, adjust, operate and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 1 is a top plan view of an embodiment according to this invention.

FIG. 2 is a side elevational view thereof.

FIG. 3 is a sectional view of the housing with funnel taken substantially along line 3—3 of FIG. 1.

FIG. 4 is a axial sectional view taken substantially on line 4—4 of FIG. 1.

FIG. 5 is a partial sectional view of the funnel taken substantially along line 5—5 of FIG. 3.

DESCRIPTION OF THE PREFERRED EMBODIMENT

The wind machine of this invention is placed upon a series of concentric tracks 10, 12, 14, and 16. Frame 18 is mounted upon said tracks by wheels 20. The center of the circles formed by the tracks is indicated in the drawing by well 22.

Although the necessary mechanical transmission elements, such as gears, shafts, bells, etc., have not been shown for clarity of the drawing, it will be understood that a mechanical transmission could be connected from output shaft 24 of the wind machine to the well 22 to pump water from the well. Obviously this is so because, at all times, the machine will operate in a circular path about the well with the well in the center of the circle.

For clarity of the drawing, the sole output from the output shaft 24 of the wind machine is shown connected by belts to electric generator 26 mounted on the frame 18. However, it will be understood that the output of the wind machine would be connected by mechanical or hydraulic connections to any useful work.

Wheel or impeller 28 is attached to the output shaft 24. The impeller is within housing 30. The impeller has a series of vanes 32. In the preferred embodiment, the vanes extend radially outward from the shaft 24 and the axis of the shaft 24 is contained in the plane of each of the vanes 32 which form a planar surface.

The vanes are all of identical size and shape. The impeller is close on each end by the end disc 34. Therefore, it may be seen that the vanes 32 with the end disc 34 and shaft 24 form an enclosed element which is responsive to a radial flow of air across the impeller.

The impeller is mounted with the shaft 24 horizontal within the housing 30. The shaft is supported by suitable bearings within end plates 36. As seen in FIG. 3, at least a portion of the end plates 36 have a spiral configuration so that there is considerable clearance at the top of the housing between the impeller vanes 32 and scroll 38 which extends between the end plates to enclose the housing. Therefore, there is a large clearance between the top of the vanes and the scroll, but at the bottom of the impeller, the vanes are very close to the scroll 38 so that the only clearance is that clearance necessary for mechanical operation. The end plates are not parallel but angle so that they are closest together at the back of the housing 30. Thus it may be seen that all wind which enters through throat 40 of the housing is directed toward the vanes so that at the bottom and back there is no place for the wind to go except against the vanes and there is no appreciable space between the end disc 34 and the end plate 36, nor is there any space between the tip of the vanes 32 and the scroll 38. Therefore, all the wind entering through throat 40 is utilized for rotating the impeller 28. The shape of the end plates are more plainly seen from the drawing.

The end plates 36 extend forward of the impeller 28. Baffle 41 extends from the forward portion of the end plates 36 between the two end plates to a point adjacent to the vanes 32. It may be seen that the top of the scroll 38 and the baffle 41 are not parallel but form an angle to one another to further concentrate and increase the velocity of the wind just before the wind acts upon the vanes 32. In this regard, the baffle 41 and forward top portion of the scroll 38 form a continuation of funnel 44 directing the wind to the impeller.

The scroll 38 extends along the bottom of the housing and has an upturned portion 42. Exhaust chamber 46 is formed below the baffle 41 and forward of the impeller 28, which has foil 43 around this portion of the impeller and above the upturned portion 42 as shown. Exhaust port 48 is located in the housing whereby the wind is exhausted after having acted upon the vanes of the impeller 28.

Exhaust valve 50 extends over the exhaust port 48. The exhaust valve 50 is in the form of a flap of sheet metal which is hinged by exhaust hinge 52 at the lower edge of the exhaust valve to the upturned portion 42 of the scroll 38 at the forward part of the housing 32. The exhaust wind escaping from the exhaust chamber 46 as well as the weight of the exhaust valve 50 normally maintain the exhaust valve 50 in the open position. However, high or excessive winds will tend to close the exhaust valve through operation of exhaust cables 54 as will be explained later.

Throttle valve 56 is hinged by throttle hinge 58 attached to baffle 41 at approximately the midpoint thereof. Throttle valve 56 normally lies flat against the baffle 41 into the funnel 44; however, by operation of throttle cables 60, the throttle valve is raised about hinge 58, therefore decreasing the size of the opening into the impeller and reducing the amount of wind which may act upon the impeller or wheel 28.

Choke flap 62 is mounted on top of the housing 30 and is pivoted to the housing by stub shafts in bearings 66 (FIG. 2). The stub shafts are parallel to the output shaft 24 as is the exhaust hinge 52 and the throttle hinge 58. The choke flap is free to pivot back and forth. The forward pivoting of the choke flap is limited by forward posts 68 and the backward pivoting of the choke flap is limited by back post 70 (FIG. 3). The top end of the exhaust cable 54 and the top end of throttle cable 60 are attached to the choke flap 62. The arrangement of the cables are as shown in the drawing. In light and moderate winds, the weight of the throttle valve 56 and the exhaust valve 50 will hold the choke flap 62 forward against the forward post 68. The opening at the exhaust port 48 and the throat 40 of the housing will be unobstructed. However in strong or high winds, the wind will rotate the choke flap 62 backwards toward back post 70, which will close the exhaust valve 50 and the throttle valve 56, thus overcoming the weight of these elements. The throttle valve within the air stream from the funnel 44 to the impeller 28 reduces the cross sectional area and, therefore reduces the wind to the impeller. Thus, the throttle valve forms a part of limit means to reduce the wind on the impeller. Likewise it may be seen that the exhaust valve with its associated cables attached to the flap also form limit means responsive to movement of the flap for reducing the wind on the impeller.

As previously stated, the funnel 44 is part of the housing. As seen in the drawing, the mouth 74 of the funnel is much larger than the throat 76 of the funnel. The throat 76 is at the the throat 40 of the housing and is the same size so a smooth transition is formed. The mouth 74 of the funnel is illustrated at or adjacent to the well 22 which is at the center of the concentric tracks 10 through 16.

Wind shield 78 extends from the bottom of the funnel 44 in front of the exhaust port 48 to prevent from blowing into the exhaust port. The funnel 44 is rectangular in cross section.

Further limiting means for reducing the wind on the impeller at strong and high winds include pressure relief ports 80 cut in the sides of the impeller adjacent to the throat 76 thereof as seen in the drawing. These ports are covered by pressure relief flaps 82. Therefore it may be seen that in this setting the openings in the side form limit means which are responsive to pressure flaps 82 for reducing the wind on the impeller at high or excessive winds. The pressure flaps are normally held in a closed position by attached pressure springs 84, which are attached to the funnel post 86 as seen in the drawing.

Leeward flap 88 is attached over leeward notch 90 at the forward part of one of the sides of the funnel 44. (FIG. 5). The leeward flap projects slightly forward of the funnel so that at all times the leeward flap will tend to rotate the wind motor machine slightly on the tracks. The leeward flap 88 is normally held in a full closed position by leeward spring 92 which extends also to funnel post 86 as seen. However, in very high or strong winds, the leeward flap will extend outward to the limit of leeward harness 94 against the pressure of the leeward spring 92.

When the strong winds do extend the leeward flap, it will cause the entire wind motor machine and frame 18 to rotate, the leeward flap 88 going away from the wind or to leeward. When the mouth 74 of the funnel is rotated, there will be a lessening of the wind which enters the funnel. Therefore it may be seen that this arrangement also forms a limit means responsive to movement of the leeward flap for reducing wind on the impeller.

Normally the wind motor machine is held so that the wind enters the mouth 74 of the funnel 44 fully. This is accomplished partially by two air fins 96 which extend upward from the top of the housing 30 approximately aligned with the top end plates 36. The air fins 96 are hinged to the top of the housing by hinges which extend at right angles to the output shaft 24. They are parallel to a center line of the wind machine, said center line intersecting the well 22. The fins 96 are normally held in a vertical position by fin springs 98 which extend from the top of the fins to yard arm 100. The yard arm 100 is parallel to the shaft 24. The yard arm is mounted up on top of mast 102. It will be seen that normally the fins 96 maintain the wind motor machine in proper orientation to the direction of the wind as shown by the solid arrow W in FIG. 1. However, when it is desired to rotate the wind motor machine by the leeward flap 88, the side wind pressure blowing against the fins will collapse the fins against the pressure of the fin springs 98 normally holding them upright. Therefore when the wind rotates the housing upon the concentric tracks 10, 12, 14, and 16, the air fins 96 will be blown horizontally.

As seen in the drawing, the width of the frame 18 is approximately three times the width of the wind motor machine as measured from one end plate 36 to the other end plate 36. The wide frame prevents the entire mechanism from being blown over in high winds, the wind when high is shown by broken or dashed arrow W in FIG. 1.

The mouth 74 of the funnel is illustrated at the well 22; however, it could be at the outer track 16 if so designed. With the mouth at the outer track 16, the frame turns more easily from the wind.

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawing, the following catalog of elements is provided:

| 10 | track | 54 | exhaust cables |
|----|-------|----|----------------|
| 12 | track | 56 | throttle valve |
| 14 | track | 58 | throttle hinge |
| 16 | track | 60 | throttle cables |
| 18 | frame | 62 | choke flap |
| 20 | wheels | 66 | bearing |
| 22 | well | 68 | forward post |
| 24 | output shaft | 70 | back post |
| 26 | electric generator | 74 | mouth of fan |
| 28 | impeller | 76 | throat of fan |
| 30 | housing | 78 | shield |
| 32 | vanes | 80 | pressure relief ports |
| 34 | end disc | 82 | pressure relief flaps |
| 36 | end plates | 84 | pressure springs |
| 38 | scroll | 86 | funnel post |
| 40 | throat | 88 | leeward flap |
| 41 | baffle | 90 | leeward notch |
| 42 | upturned portion | 92 | leeward spring |
| 43 | foil | 94 | leeward harness |
| 44 | funnel | 96 | fins |
| 46 | exhaust chamber | 98 | fan spring |
| 48 | exhaust port | 100 | yard arm |
| 50 | exhaust valve | 102 | mast |
| 52 | exhaust hinge | | |

SUBJECT MATTER CLAIMED FOR PROTECTION

I claim as my invention:

1. In a wind machine to extract energy from the wind having
   a. a housing,
   b. an impeller in the housing,
   c. a shaft on the impeller journaled to the housing
   d. vanes on the impeller which cause the impeller to turn in the wind,
   e. a funnel forming a portion of the housing to increase the wind at the impeller, and
   f. mounting means on the housing for rotating the housing about a vertical axis;
the improved structure for regulating the speed of the wheel comprising:
   g. at least one flap mounted for movement on the housing, and
   h. limit means responsive to the movement of and connected to the flap for reducing the wind on the impeller, and
   j. said flap is mounted upon the funnel portion of the housing, and
   k. said flap acts to rotate the entire housing so that the funnel no longer faces directly into the wind but at an angle thereto, thus
   m. reducing the wind on the impeller.

2. The invention as defined in claim 1 wherein
   n. openings in the side of the funnel which said flap opens at excessive wind.

3. The invention as defined in claim 1 with an additional limitation of
   n. said frame being at least three times as wide as said impeller.

4. The invention as defined in claim 1 with additional limitations of
   n. air fins mounted upon said housing for maintaining the housing headed into the wind, and
   o. each of said fins hinged to the housing about a horizontal axis aligned with each fin, and
   p. springs biasing the fins to a vertical position
   q. so that when the said flap on the funnel portion of the housing swings the housing away from the wind that said fins may be blown to a non-vertical position against the stress of said springs.

5. The invention as defined in claim 1 wherein said limit means includes
   n. an exhaust valve on the housing for reducing the size of
   o. an exhaust port in the housing whereby the wind is exhausted after having acted upon the vanes of the impeller.

6. The invention as defined in claim 1 with additional limitations of
   n. said shaft being normal to the direction of wind, and
   o. said vanes
      (i) extending radially outward from said shaft
      (ii) connected to said shaft, and
      (iii) extending uninterrupted radially outward therefrom.

7. The invention as defined in claim 1 wherein said limit means includes
   n. a throttle valve within the air stream from the funnel to the impeller to reduce the cross sectional area, thus
   o. reducing the wind to the impeller.

8. The invention as defined in claim 7 wherein said limit means also includes
   p. an exhaust valve on the housing for reducing the size of
   q. an exhaust port in the housing whereby the wind is exhausted after having acted upon the vanes of the impeller.

9. The invention as defined in claim 8 with an additional limitation of
   o. said flap mounted on top of the housing,
   p. cables extending from said flap to said valves for operation thereof.

10. In a wind machine to extract energy from the wind having
    a. a housing,
    b. an impeller in the housing,
    c. a shaft on the impeller journaled to the housing
    d. vanes on the impeller which cause the impeller to turn in the wind,
    e. a funnel forming a portion of the housing to increase the wind at the impeller, and
    f. mounting means on the housing for rotating the housing about a vertical axis;
the improved structure for regulating the speed of the wheel comprising:
    g. at least one flap mounted for movement on the housing, h. limit means responsive to the movement of and connected to the flap for reducing the wind on the impeller, and said limit means includes
j. an exhaust valve on the housing for reducing the size of
k. an exhause port in the housing whereby the wind is exhausted after having acted upon the vanes of the impeller,
m. said flap mounted on the top of the housing, and
n. cables extending from said flap to said valve for operating said valve.

11. The invention as defined in claim 10 wherein
q. said flap is mounted upon the funnel portion of the housing, and
r. said flap acts to rotate the entire housing so that the funnel no longer faces directly into the wind but at an angle thereto, thus
s. reducing the wind on the impeller.

12. The invention as defined in claim 11 with the additional limitation of
t. said frame being at least three times as wide as said impeller.

13. The invention as defined in claim 12 with additional limitations of
u. air fins mounted upon said housing for maintaining the housing headed into the wind, and
v. each of said fins hinged to the housing about a horizontal axis aligned with each fin, and
w. springs biasing the fins to a vertical position
x. so that when the said flap on the funnel portion of the housing swings the housing away from the wind that said fins may be blown to a non-vertical position against the stress of said springs.

14. The invention as defined in claim 13 wherein
y. openings in the side of the funnel which said flap opens at excessive wind.

15. The invention as defined in claim 14 with additional limitations of
z. said axle being normal to the direction of wind, and
zz. said vanes
(i) extending radially outward from the said axle
(ii) connected to said axle, and
(iii) extending uninterupted radially outward therefrom.

* * * * *